United States Patent
Roussel et al.

(10) Patent No.: US 9,721,541 B2
(45) Date of Patent: *Aug. 1, 2017

(54) PORTABLE COMMUNICATION DEVICE FOR AN ADVANCED DISPLAY

(71) Applicant: Thomson Licensing, Issy les Moulineaux (FR)

(72) Inventors: Joris Roussel, Paris (FR); Cedric Hutchings, Levallois-Perret (FR)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/218,759

(22) Filed: Jul. 25, 2016

(65) Prior Publication Data
US 2016/0335990 A1    Nov. 17, 2016

Related U.S. Application Data

(60) Continuation of application No. 13/046,160, filed on Mar. 11, 2011, now Pat. No. 9,401,980, which is a
(Continued)

(51) Int. Cl.
*H04H 20/74* (2008.01)
*H04M 1/00* (2006.01)
(Continued)

(52) U.S. Cl.
CPC .......... *G09G 5/39* (2013.01); *G06F 3/14* (2013.01); *G06F 17/30905* (2013.01); *G09G 5/14* (2013.01); *H04L 67/28* (2013.01); *H04L 67/2828* (2013.01); *H04L 67/303* (2013.01); *H04M 1/72522* (2013.01); *H04M 1/72561* (2013.01); *H04M 1/72583* (2013.01); *H04W 28/14* (2013.01); *G06F 3/147* (2013.01);
(Continued)

(58) Field of Classification Search
CPC .......... H04M 1/00; H04W 4/18; H04H 60/09
USPC ........... 455/6.04, 556.2, 566; 370/338
See application file for complete search history.

(56) References Cited

U.S. PATENT DOCUMENTS 7,925,202 B2 * 4/2011 Roussel ............ G06F 17/30905
370/389
9,401,980 B2 * 7/2016 Roussel ............ H04M 1/72522
(Continued)

FOREIGN PATENT DOCUMENTS

| FR | 2813736 | 3/2002 |
|---|---|---|
| WO | WO 00/65800 | 11/2000 |
| WO | WO 01/43433 | 6/2001 |

OTHER PUBLICATIONS

Search Report dated Jul. 28, 2007.

*Primary Examiner* — William D Cumming
(74) *Attorney, Agent, or Firm* — Tutunjian & Bitetto, P.C.

(57) ABSTRACT

A portable communication device equipped with a screen and a random access memory. The device receives a data stream through a radio link for automatically displaying information from the data stream on a display screen, without any user's request, a part of this information being stored in random access memory during a period of time that is longer than the duration of display and displays information from the data stream on the display screen, upon user's request, this information being stored in random access memory during the duration of display only.

5 Claims, 7 Drawing Sheets

Related U.S. Application Data division of application No. 12/224,268, filed as application No. PCT/FR2007/050888 on Mar. 7, 2007, now Pat. No. 7,925,202.

(51) Int. Cl.

| | | |
|---|---|---|
| *H04B 1/38* | (2015.01) | |
| *G09G 5/39* | (2006.01) | |
| *G06F 17/30* | (2006.01) | |
| *H04M 1/725* | (2006.01) | |
| *H04W 28/14* | (2009.01) | |
| *H04L 29/08* | (2006.01) | |
| *G06F 3/14* | (2006.01) | |
| *G09G 5/14* | (2006.01) | |
| *G06F 3/147* | (2006.01) | |
| *H04W 4/18* | (2009.01) | |
| *H04W 88/02* | (2009.01) | |
| *H04W 88/08* | (2009.01) | |

(52) U.S. Cl.
CPC . *G09G 2340/145* (2013.01); *G09G 2360/128* (2013.01); *G09G 2370/02* (2013.01); *G09G 2370/16* (2013.01); *H04W 4/18* (2013.01); *H04W 88/02* (2013.01); *H04W 88/08* (2013.01)

(56) References Cited

U.S. PATENT DOCUMENTS

| | | | |
|---|---|---|---|
| 2002/0105539 A1 | 8/2002 | Gamzon et al. | |
| 2003/0046432 A1 | 3/2003 | Coleman et al. | |
| 2009/0221326 A1* | 9/2009 | Roussel | H04M 1/72522 455/556.2 |
| 2011/0164601 A1* | 7/2011 | Roussel | H04M 1/72522 370/338 |
| 2016/0335990 A1* | 11/2016 | Roussel | H04M 1/72522 |

* cited by examiner

PORTABLE COMMUNICATION DEVICE FOR AN ADVANCED DISPLAY

CROSS REFERENCE TO RELATED APPLICATIONS

This application is a Continuation of U.S. Ser. No. 13/046,160 filed on Mar. 11, 2011, incorporated herein by reference in its entirety.

SCOPE OF THE INVENTION

The present invention relates to the field of telecommunications.

The present invention more particularly relates to a communication device and a base for an advanced display of information.

PRIOR ART

The development of information content available on remote servers is accompanied by a diversification of content sources and formats on one hand, and terminals that allow access to this content on the other hand.

Portable items of equipment must comply with the heavy constraints of cost and encumbrance. Today, they are the preferred target of new content available on the Internet.

Only the most advanced products respond to these constraints (memory, autonomy, bitrate) and enable a rendering of the available content having a satisfactory quality.

Today's portable items of equipment have evolved display peripherals (array screens, multilines, black and white or colour) that enable rendering of advanced information displays.

However, they remain heavily limited by their hardware resources and must respond to heavy cost constraints.

The prior art knows, through the U.S. Pat. No. 6,920,488 (IBM), a system assisted by a server for accessing Web pages from a Personal Digital Assistant (PDA). The PDA communicates with the Internet through a wireless Internet gateway and a portal server able to access Internet resources such as servers. The portal server comprises a database comprising at least identification information allowing retrieval of Web page fields selected by the user, and processing means for accessing the selected Web page fields. The PDA comprises browsing means for browsing the selected fields of Web pages and for retrieving at least one of them as well as display means for displaying the field of the retrieved Web page.

SUMMARY OF THE INVENTION

The display of remote content requires equipment that must respond to the following constraints:
  a significant volatile memory to enable the display of advanced information (with caching functions),
  a network connectivity having a high bandwidth to enable transfer of this information,
  an advanced power supply system to guarantee a sufficient degree of autonomy for its operation.

The present invention proposes to minimize as much as possible these constraints while guarantying optimal rendering and user friendliness to the user.

One of the aims of the present invention is to optimize the available technical solutions, and to offer to low-cost devices such as DECT handsets a quality of service equivalent to the one available on high-end handsets.

The technical problem the present invention seeks to solve consists in improving the display of information on a portable communication device while guarantying a reduced consumption of hardware resources (memory, use of the radio link and energy consumption).

To this purpose, the present invention concerns, in its most generally accepted sense, a portable communication device equipped with a screen and a random access memory comprising:
  means for receiving a data stream through a radio link;
  characterized in that it comprises:
    means for automatically displaying information (I1) from the data stream on said display screen, without any user's request, a part of this information (I1) being stored in random access memory during a period of time that is longer than the duration of display;
    means for displaying information (I2) from the data stream on said display screen, upon user's request, this information (I2) being stored in random access memory during the duration of display only.

Preferably, the portable communication device comprises means for successively displaying information from the data stream on said screen, without any user's request.

According to an embodiment, the portable communication device comprises means for displaying in parallel, on a split screen, information from a data stream on said screen, without any user's request.

Advantageously, the data stream received from the radio link is formatted according to predefined textual and graphical elements.

According to an embodiment, the data stream received from the radio link is formatted according to two models constituted of predefined textual and graphical elements, a first model for the display of information without any user's request and a second model for the display of information upon user request.

The present invention also relates to a base adapted to communicate with a portable communication device, comprising:
  means for connecting to a network;
  means for receiving data through said network;
  means for receiving requests through a radio link;
  characterized in that it comprises:
    means for detecting updates of information received through said network;
    means for transmitting data through said radio link, without receiving any request, in case of detection of updates of data received through said network;
    means for transmitting data through said radio link, upon reception of a request through said radio link.

Preferably, the base comprises means for formatting a data stream received from said network.

Advantageously, the data stream received from said network is formatted, at the level of said base, according to predefined textual and graphical elements.

According to an embodiment, the formatting of the data stream, at the level of said base, is carried out according to two models constituted of predefined textual and graphical elements, a first model for the transmission of data without reception of a request and a second model for the transmission of data upon reception of a request.

The joint implementation of a content aggregator Access Point (PA) completed by management of the display model on two levels (standby, active) according to the content use case enables the addition of advanced display functionalities and browsing in content from remote servers. Moreover, the present invention takes full advantage of the possibility to use display models having very different renderings, while optimizing to maximum effect the use of the random access memory (costly component) and of the radio link in order to guarantee the greatest possible degree of autonomy. It thus allows to obtain a service level close to that of the high-end "lighter" Portable Equipments.

According to a first variant, a display model is a set of graphical and textual elements permanently embedded in the portable equipment in the read-only memory or data flash.

According to a second variant, a display model is a set of graphical and textual elements dynamically loaded and stored in the random access memory of the portable equipment. To this display model is associated a dynamic content, called descriptive elements of the display model, constituted from elements extracted from formatted streams. The rendering on the screen of the portable equipment is the association of dynamic content and rules and elements of the corresponding display model.

BRIEF DESCRIPTION OF THE DRAWINGS

The invention will be better understood from the following description of an embodiment of the invention provided as an example by referring to the annexed figures, wherein.

DETAILED DESCRIPTION OF THE EMBODIMENTS OF THE INVENTION

A portable equipment EP is connected through wireless communication means to an access point PA, that can communicate with remote servers via a network connection.

According to the present invention, the notification, the display and the refreshing of dynamic information are possible on the standby screen while minimizing the memory used and the power consumption as well as the display of more detailed content at the user's request.

The present invention is based on the use of a set of display models in the portable equipment in order to optimize the rendering of information for the user while reducing as much as possible consumption of hardware resources (memory, radio link use, power consumption). These display models also allow an organization of a sequential display system of different available items of information without requiring dialog with the access point PA. Finally, these display models enable minimizing as much as possible the traffic exchanged between the EP terminal and the PA access point to "useful" information.

The role of the PA access point is to recover the information content from remote servers, to detect updates from a previous recovery, to extract the necessary data, and only these data, for building elements that are constitutive of the display models.

Figure 1:
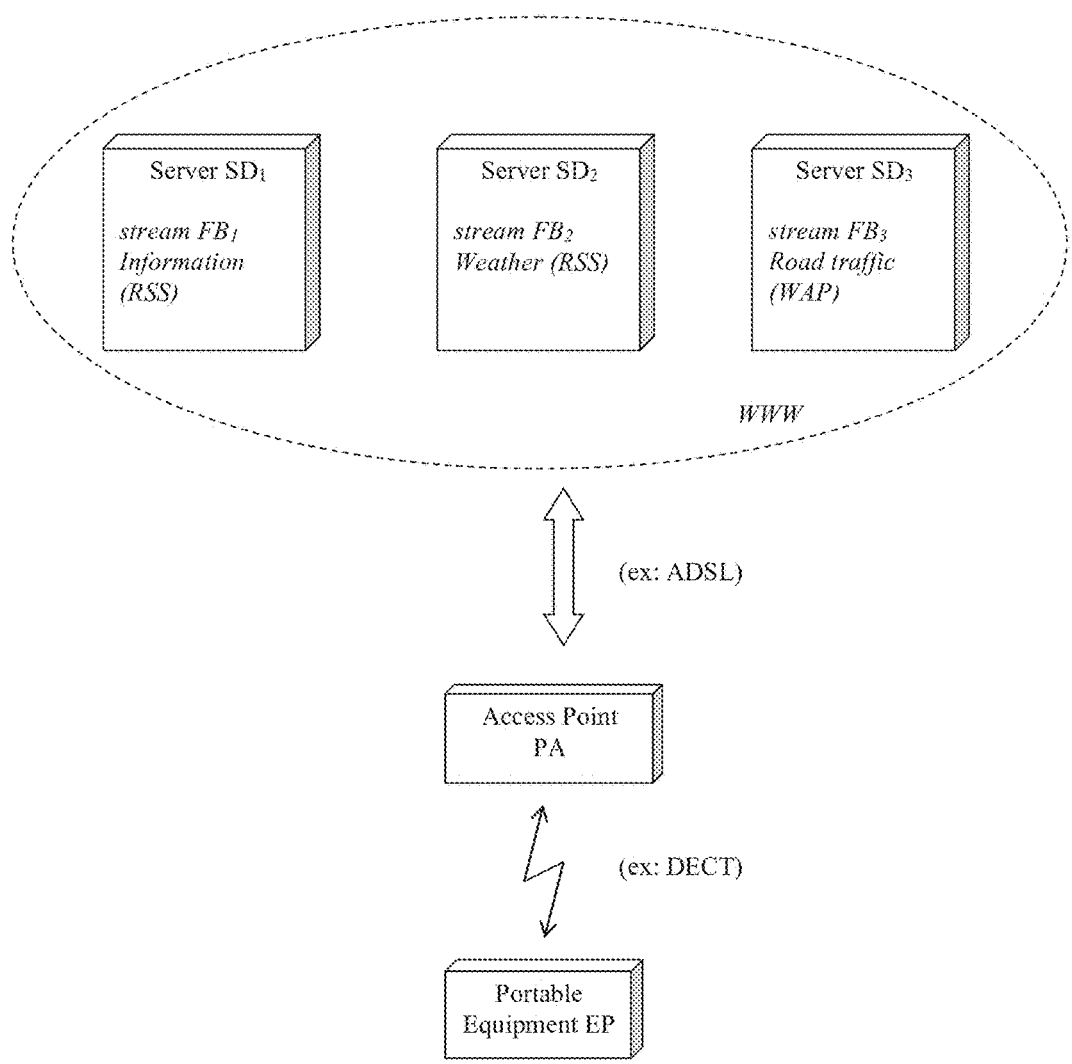
FIG. 1 shows an architecture for the implementation of the method according to an embodiment of the present invention.

The general architecture of the system, as shown on FIG. 1, is composed of the following elements:
  a portable equipment EP connected via a wireless link, to
  an access point PA, itself linked, via a network connection (for example, Ethernet for the local network or ADSL for the Internet), to
  a set of $SD_n$ remote content servers.

The function of the PA access point can be fulfilled by a residential gateway integrating a DECT base, but also by a network server when the terminal is a GSM handset. The problematic remains the same. No assumptions are therefore made on its location.

In a conventional approach, the display of data from advanced protocols (XML, WML, HTML, etc.) requires either the use of a large random access memory to store information on the EP terminal for its display, or a data link used each time a screen refresh is necessary (in the case where data effectively stored in the EP terminal volatile memory are minimised). These options are both costly, the first due to the increased cost of large sized memories, the second in terms of power consumption, and therefore in terms of the terminal's autonomy in mobile use.

The alternative approach proposed by the present invention allows to overcome the discrepancy of the two problems highlighted above, that is to minimize the electrical consumption as well as the requirements in random access memory of the EP terminal.

This functionality is fulfilled by the introduction of "proxy" functions in the PA access point associated with the EP terminal and an extraction module for useful data in this same PA, associated with the installation of display models to re-establish an "advanced" formatting of the available information on the EP terminal.

The content distributed by the $SD_n$ remote servers are transported according to different protocols (XML, RSS, WML, HTML, etc.) that the PA interprets to extract useful information necessary to the constitution of display model elements.

At its level, the EP terminal has no knowledge of the protocol that has served as a content routing support from the $SD_n$ remote servers to the PA access point. The transfers between the PA and the EP are made following a single and unique protocol composed of a series of associated content display model descriptive elements.

Figure 2:
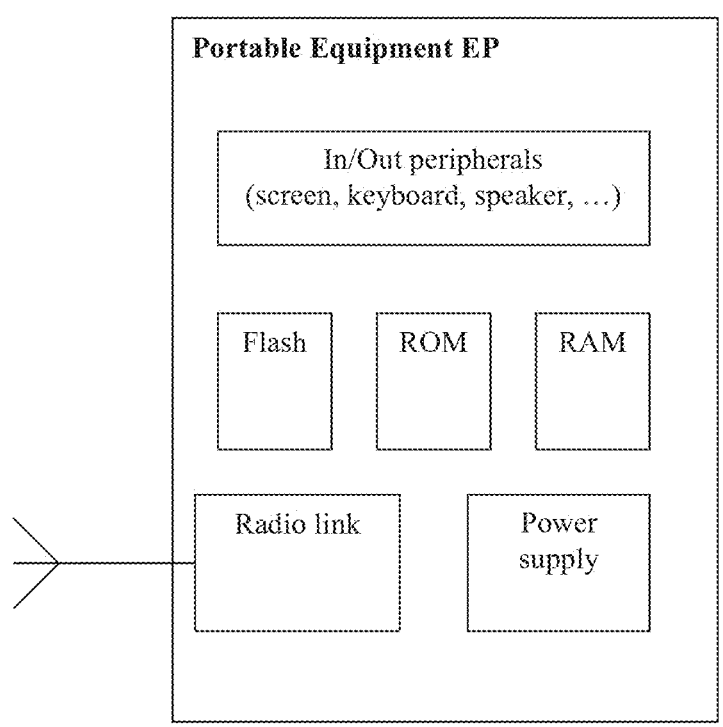
FIG. 2 represents a portable equipment.

The EP portable equipment, shown in FIG. 2, comprises the following elements and functionalities:
  a set of input/output peripherals: display, keyboard, loudspeaker,
  a processor (not represented),
  a non-volatile memory containing the code and the software data ensuring the operation of the equipment,
  a volatile memory (RAM) containing data that is "variable" in time,
  a wireless data link (that can serve as voice support in the case of a telephone),
  an accumulator block ensuring the power supply of the equipment.

Two operating states of the EP terminal can be distinguished:
  standby: the content is displayed automatically and successively via display models in MAV standby mode. Thanks to this method, the terminal, though in standby mode, continues to display content obtained from the network, but without implicating an energy consuming radio activity.
  active: the user requests more information on a particular content. The new content is displayed via MAA active mode display models.

For example:
Remote server content=>MAV constitutive elements-→MAA constitutive elements
information=>titles→title details
Weather=>current conditions→forecasts for several days Traffic news=>general situation→detailed mapping, details on conditions Electronic and vocal messaging service=>number of messages read, not read→message details The two states "standby" and "active" correspond to two communication implementations based on the display model. They enable splitting of the information into two parts corresponding to the information which must be stored in the EP for display on the standby screen and the information to be sent to the EP only on request of the user. This additional level of the display model enables a higher level of optimization of memory management and of the terminal's consumption (low usage of the radio link).

A display model is a set of textual and graphical elements, some being permanently embedded in the EP (read-only memory, flash data), while others are dynamically loaded and stored in the random access memory of the EP.

For example, an RSS stream transporting meteorological data can contain the following information: date, temperature, humidity, description, weather code, forecasts, picture representing the current and future weather conditions.

The PA extracts only information required by the "Weather" display model and sends them to the EP. This latter therefore, only stores information that it requires (for example, temperature, humidity and code).

The display model (contained in ROM or Flash) can re-format the content in a more advanced way by introducing information from the PA to the graphical elements present in its non-volatile memory.

The display of weather data can therefore be composed of different textual elements (temperature, humidity) and a pictogram associated with the code element.

The user can customize the origin of the stream (according to the available display models) via a configuration page in the PA or a configuration menu in the EP.

The access point downloads a set of unformatted streams FB transported according to a protocol or several protocols. It then extracts information that is useful for the constitution of descriptive elements of the associated display models and sends the corresponding condensate to the MAV (standby mode display model) of the EP. It stores the descriptive elements of the MAA (active mode display model) locally and only transmits it to the terminal upon user request.

The MAV constituent elements are thus conserved permanently in the random access memory of the EP until the next stream refresh while the MAA constituent elements are only stored for the time of display of a given content (defined by the user).

Each FB (unformatted stream from a remote server) can have its associated display model.

Each display model can be used for several FBs.

Figure 3:
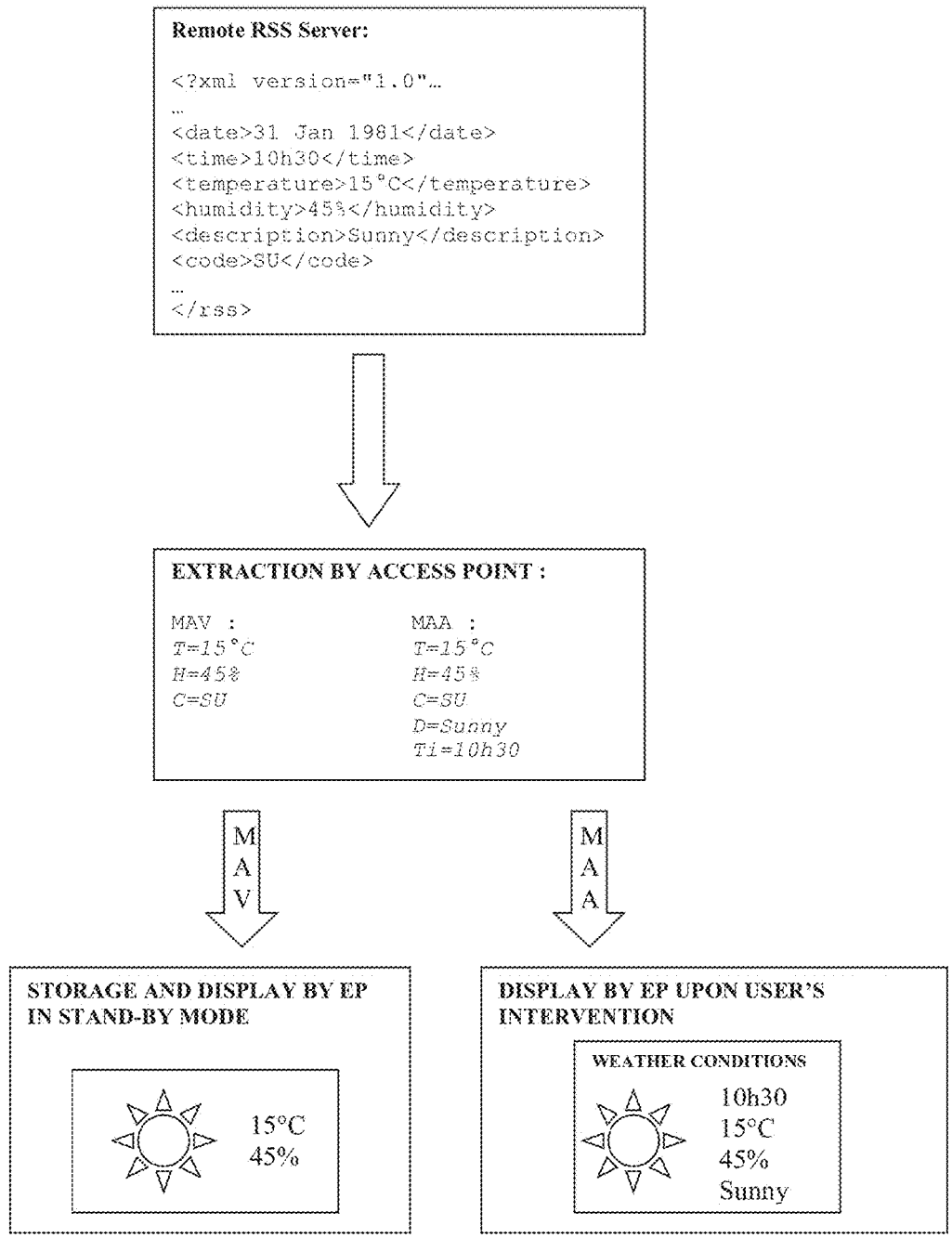
FIG. 3 illustrates an embodiment of the method according to the embodiment of the present invention.

FIG. 3 shows the display method according to the present invention with the example of an RSS stream containing meteorological data.

The access point receives the useful data under the XML/RSS protocol for example. This unformatted stream FB contains several information elements not used by the MAV display model (date, time, description, etc.) that could significantly increase the occupation of the random access memory in the handset as well as the power consumption, this last being strongly associated with the use of a radio link for the transmission of data and the necessary refresh of the memory would no more allow to store other FF (formatted streams).

If the MAV display model is composed of information on temperature, humidity and a pictogram representing the meteorological conditions, the PA then extracts from the content the attributes of temperature, humidity and code. The portable equipment EP builds the display of this information by directly writing the data of temperature and humidity, and associating a pictogram, stored in its flash or read-only memory (ROM), with the received code. The constituent elements of the display models in active mode MAA are also extracted and stored locally in the PA to be transmitted only upon request of the user.

The consumption in random access memory is therefore reduced by several bytes instead of the tens of bytes required to store the entire FB.

This reduction in memory enables storing in the random access memory in parallel several contents, each having a descriptive display model. The EP can then organize its standby screen by displaying successively or in parallel this information in a shared screen without requesting an update from the PA.

This update would have been necessary if the random access memory had not been sufficient to store the contents in parallel and would have generated hence, an electrical over-consumption due to the more frequent use of the radio link.

Thanks to the present invention, the content is refreshed only when necessary, that is when the PA detects an update of the FB remote stream and notifies the EP.

Taking the case of a content scrolling every 10 s, a solution that does not use this invention would imply opening a radio link every 10 s, which would then imply an electrical over-consumption which would be strongly prejudicial for the product.

In a standard approach, the solution would then be either:
to increase the electrical autonomy via more powerful accumulators, to drastically increase the size and/or the cost of the product,
to increase the memory size to store more streams: high price increase because the random access memory is a costly component,
remove the possibility of sequentially and automatically displaying different contents: reduced interest of the product.

The present invention thus enables successively displaying different contents, depending on different display formats. The radio link is only used for stream updates, or for example every half hour, thus the autonomy is greatly increased.

The diversity of the models constitutes an added value particular to the product from the user perspective.

As examples of rendering can be listed:
weather: pictogram associated with temperature and humidity (RSS stream for instance),
news: display of headlines in the form of a banner (RSS stream for instance)
road traffic: mapping (WAP site for instance).

The display models are independent of the protocol used by the SD. The role of the PA is to extract information that is useful for the display models from the corresponding information stream and its associated protocol, and to supply the EP terminal on the basis of a previous knowledge of the MAV and MAA models of the device.

The profiles of the MAV and MAA display models are noted by the device when registering with the PA. They are the basis of the "filter" applied by the PA between the SD server and the EP terminal. The gain is a simplified management of the grouping of heterogeneous terminals, in the case of an update of an EP device, for instance new supported profiles, or the addition of a new device.

Figure 4:
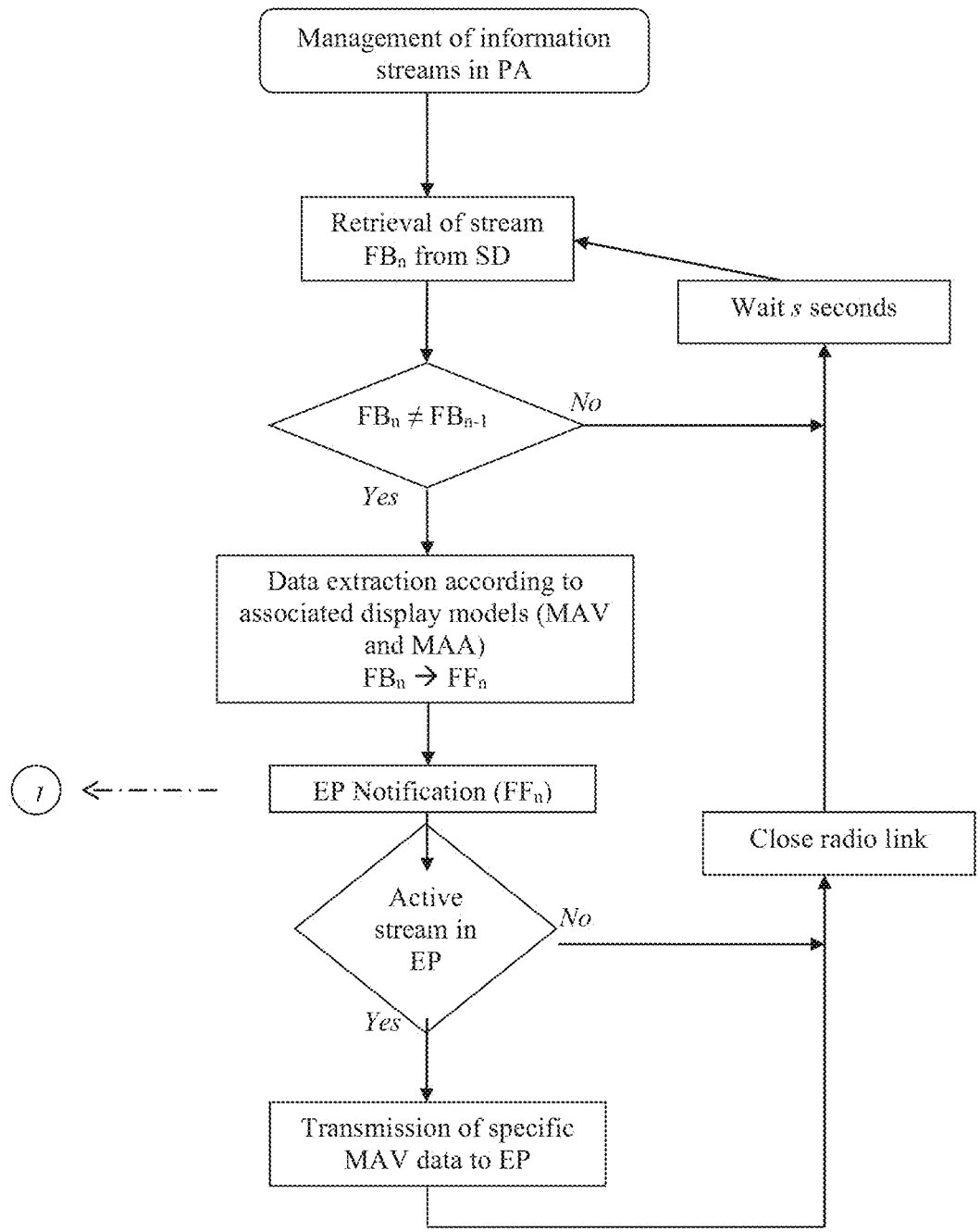
FIGS. 4, 5, 6 and 7 are flowcharts illustrating the display method according to the embodiment of the present invention.

FIG. 4 shows the principle of stream management in the PA access point.

With a predefined periodicity in the PA access point, the PA downloads the contents from remote servers. If the stream is different from the preceding stream (criterion of date/time, checksum, etc.), the PA extracts the necessary data from the associated MAV and MAA display models (building of FF formatted stream from the FB unformatted stream) then notifies the EP.

In order to preserve the memory consumption of the EP device and avoid useless exchanges on the wireless link, the EP terminal informs the PA if the stream is activated (activation/deactivation by the user). If it is activated, the PA sends the FF extracted information (corresponding to the MAV) to the device and closes the radio link.

The activation/deactivation of the display of FF is carried out by the user in the EP.

This configuration possibility, in addition to the freedom offered to the user to suppress the display of non-requested information, enables the PA to manage the FB more than the EP allows. The EP is in charge of limiting the number of displayable FF according to the available memory via an appropriate user interface.

Figure 5:
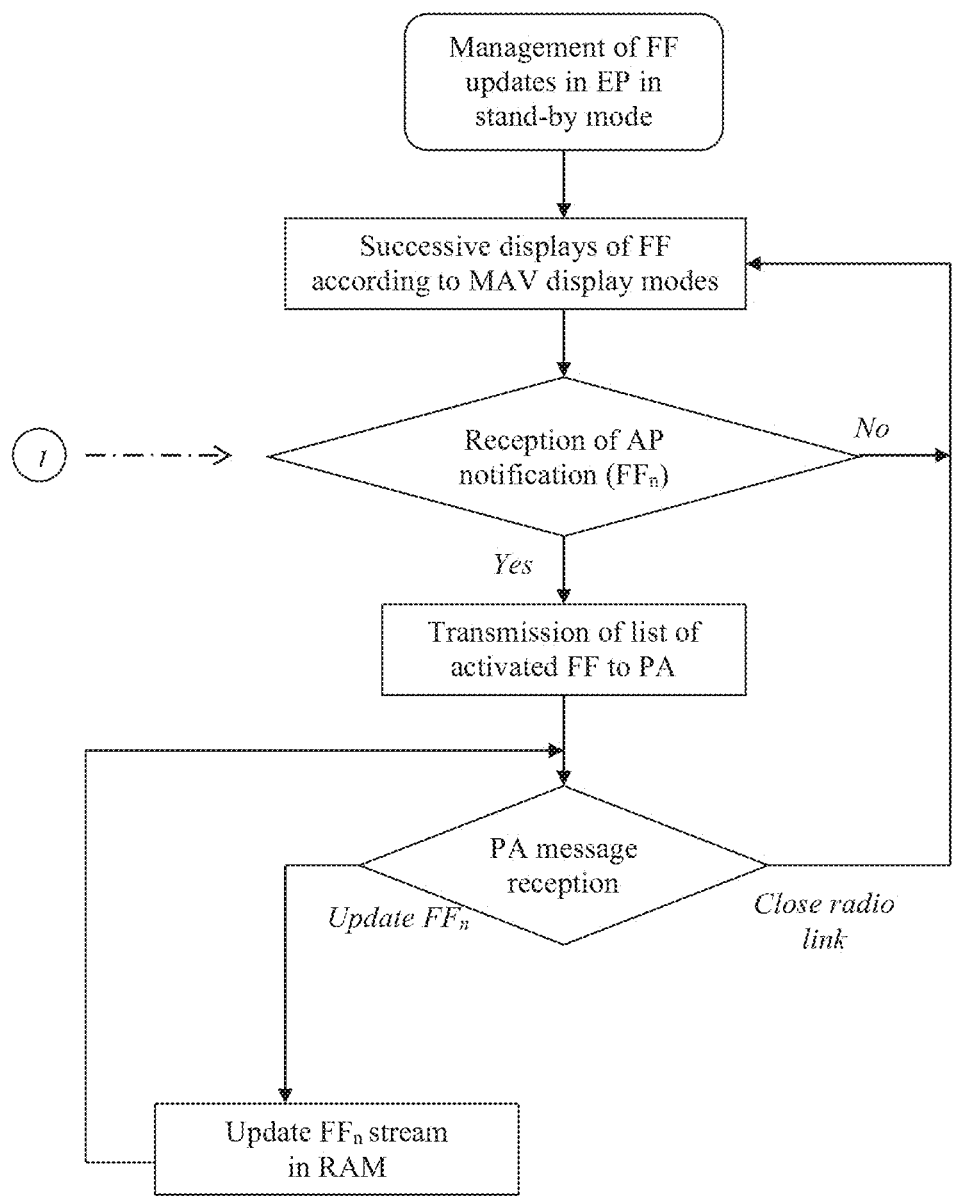

FIG. 5 represents the principle of display management and the update of FF formatted streams in the EP (in standby).

In standby, the EP terminal successively displays the contents that the user has activated following the rules described by the corresponding MAV standby display models.

Upon reception of a notification of an update from a PA access point, the EP sends the list of activated contents. In response, the PA sends the content of the modified MAV and closes the radio link at the end of transmission (it closes it as soon as there is no stream update activated).

Figure 6:
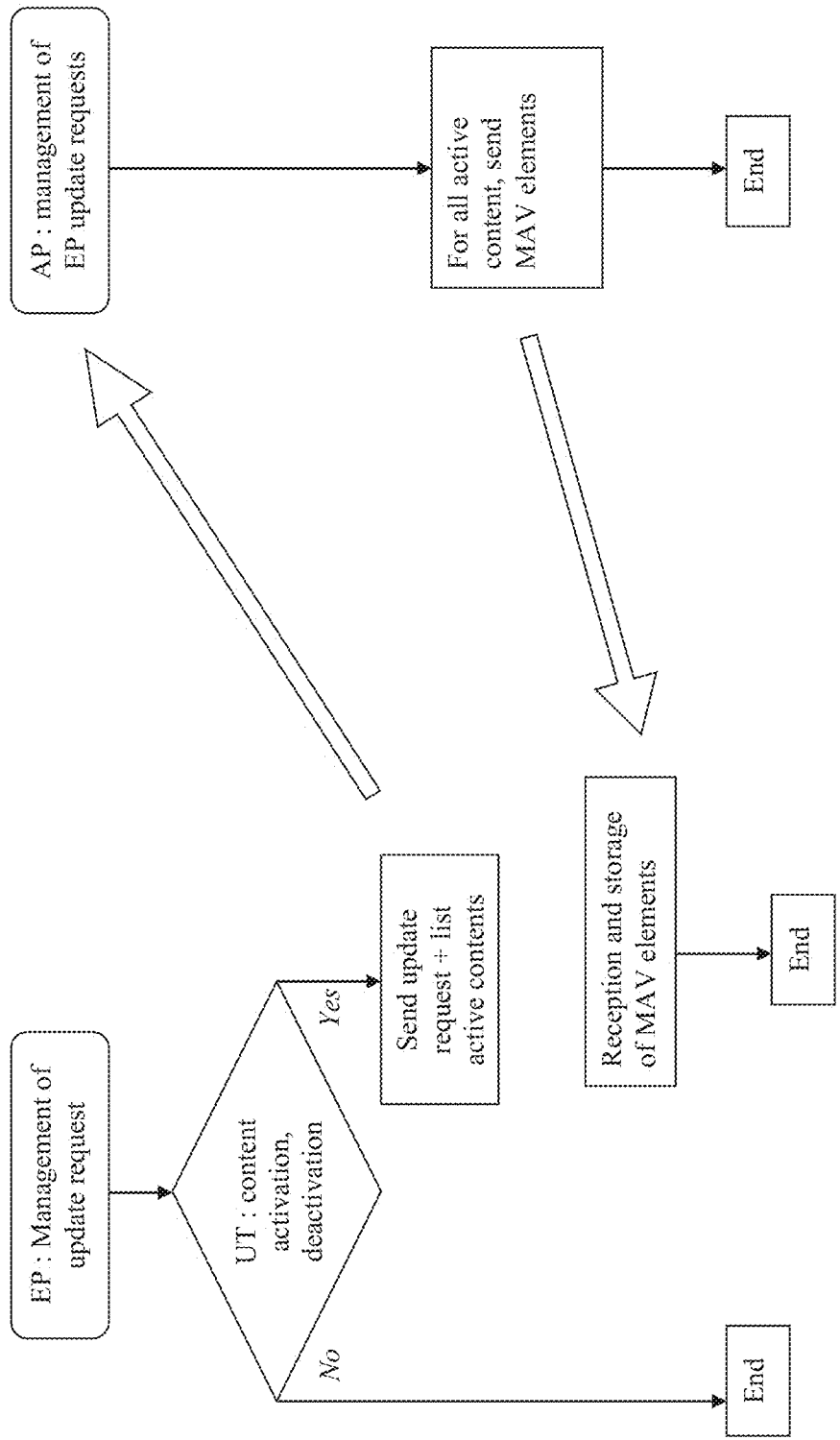

Alternatively, when the user activates/deactivates a given content, the EP can send an update request to the PA, as shown in FIG. 6. The PA then successively sends back the updates of the corresponding contents.

In an extension of the standby mode, the active mode intervenes when the user (UT) requests details on a displayed content. In practice, he could, for instance, at the time when a content is displayed via his MAV, request the content details by pressing a specific button.

Figure 7:
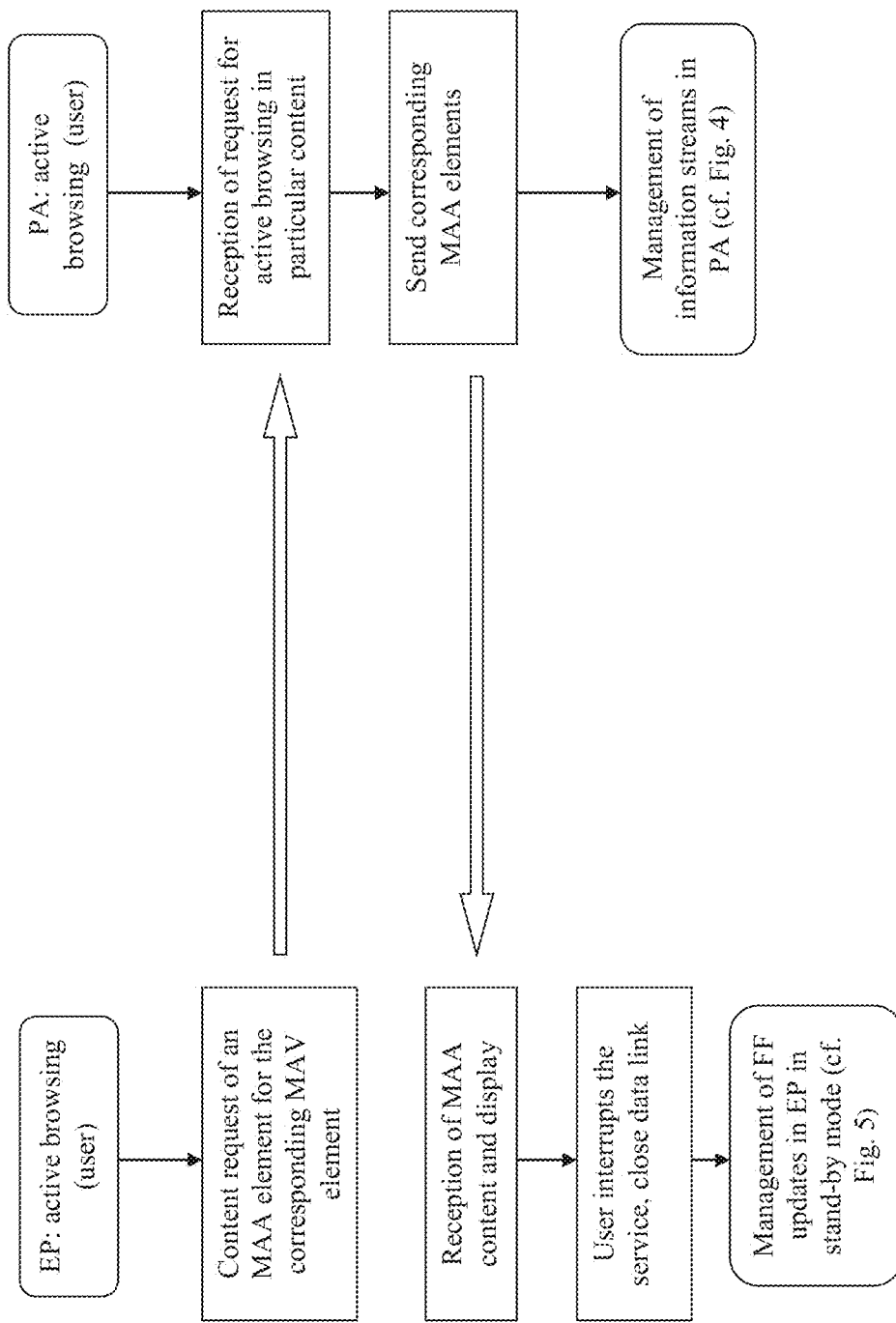

In this case, illustrated in FIG. 7, the content is not stored in the EP for future use. It is transferred, displayed and "forgotten" as soon as the user decides to cease consultation.

The terminal then returns either to a standby state, or to another content.

An additional upgradeable character of the product can be implemented via the update of the display models stored in Data Flash by the intermediary of the radio link. This update being exceptional, its impact on autonomy is negligible.

The invention is described in the preceding text as an example. It is understood that those skilled in the art are capable of producing variants of the invention without leaving the scope of the patent.

The invention claimed is:

1. A portable communication device equipped with a display screen and a random access memory comprising:
    an antenna configured to receive a data stream through a radio link;
    a processor configured to work with the random access memory to automatically display information from the data stream on said display screen, a part of the information being stored in the random access memory during a period of time that is longer than the duration of the display;
    said processor and said random access memory being further configured to display information from the data stream on said display screen upon request, the requested information being stored in the random access memory only during the duration of the display.

2. The portable communication device according to claim 1, wherein the processor and the random access memory are further configured to successively display information from the data stream on said display screen.

3. The portable communication device according to claim 1, wherein the processor and the random access memory are further configured to display, in parallel, on a split screen, information from said data stream on said display screen.

4. The portable communication device according to claim 1, wherein the received data stream is formatted according to textual and graphical elements.

5. The portable communication device according to claim 4, wherein the data stream received from the radio link is formatted according to two models of said textual and graphical elements, a first model for the display of information absent a request and a second model for the display of information upon request.

* * * * *